United States Patent [19]

Pettersson

[11] 4,378,198
[45] Mar. 29, 1983

[54] WINDMILL

[76] Inventor: Bertil Pettersson, Bjulevägen 26, S-122 41 Enskede, Sweden

[21] Appl. No.: 224,556
[22] PCT Filed: Mar. 19, 1980
[86] PCT No.: PCT/SE80/00084
 § 371 Date: Nov. 25, 1980
 § 102(e) Date: Nov. 25, 1980
[87] PCT Pub. No.: WO80/02056
 PCT Pub. Date: Oct. 2, 1980

[30] Foreign Application Priority Data

Mar. 27, 1979 [SE] Sweden .................... 7902699

[51] Int. Cl.³ .................................... F03D 7/04
[52] U.S. Cl. .................................... 416/140; 416/11; 416/132 B
[58] Field of Search ............... 416/140 R, 140 A, 106, 416/132 B, 107, 11

[56] References Cited

U.S. PATENT DOCUMENTS

| 2,484,291 | 10/1949 | Hays | 416/102 X |
| 2,533,785 | 12/1950 | Fumagalli | 416/142 B X |
| 3,144,082 | 8/1964 | Grant et al. | 416/106 |
| 4,073,600 | 2/1978 | Doman | 416/148 |
| 4,201,514 | 5/1980 | Huetter | 416/37 |

FOREIGN PATENT DOCUMENTS

| 2546884 | 4/1977 | Fed. Rep. of Germany | 416/132 B |
| 2739297 | 3/1978 | Fed. Rep. of Germany | 416/132 B |
| 1010155 | 6/1952 | France | 416/11 |
| 40533 | 12/1957 | Poland | 416/132 B |
| 7707210 | 1/1979 | Sweden | 416/140 R |
| 732572 | 5/1980 | U.S.S.R. | 416/132 B |

Primary Examiner—Everette A. Powell, Jr.
Attorney, Agent, or Firm—Murray Schaffer

[57] ABSTRACT

A wind-turbine having a horizontal shaft carrying the turbine blades, hinged in such a manner that a limited flapping movement is possible. The flap angle of the turbine blade is adjustable by means of the position of the piston of a double-acting piston-cylinder drive means. The two chambers of the piston-cylinder drive means are connected to one another over a regulatable throttle valve. A regulatable pump is coupled in parallel with the throttle valve and coacts with it to oscillate or lock the blades.

1 Claim, 2 Drawing Figures

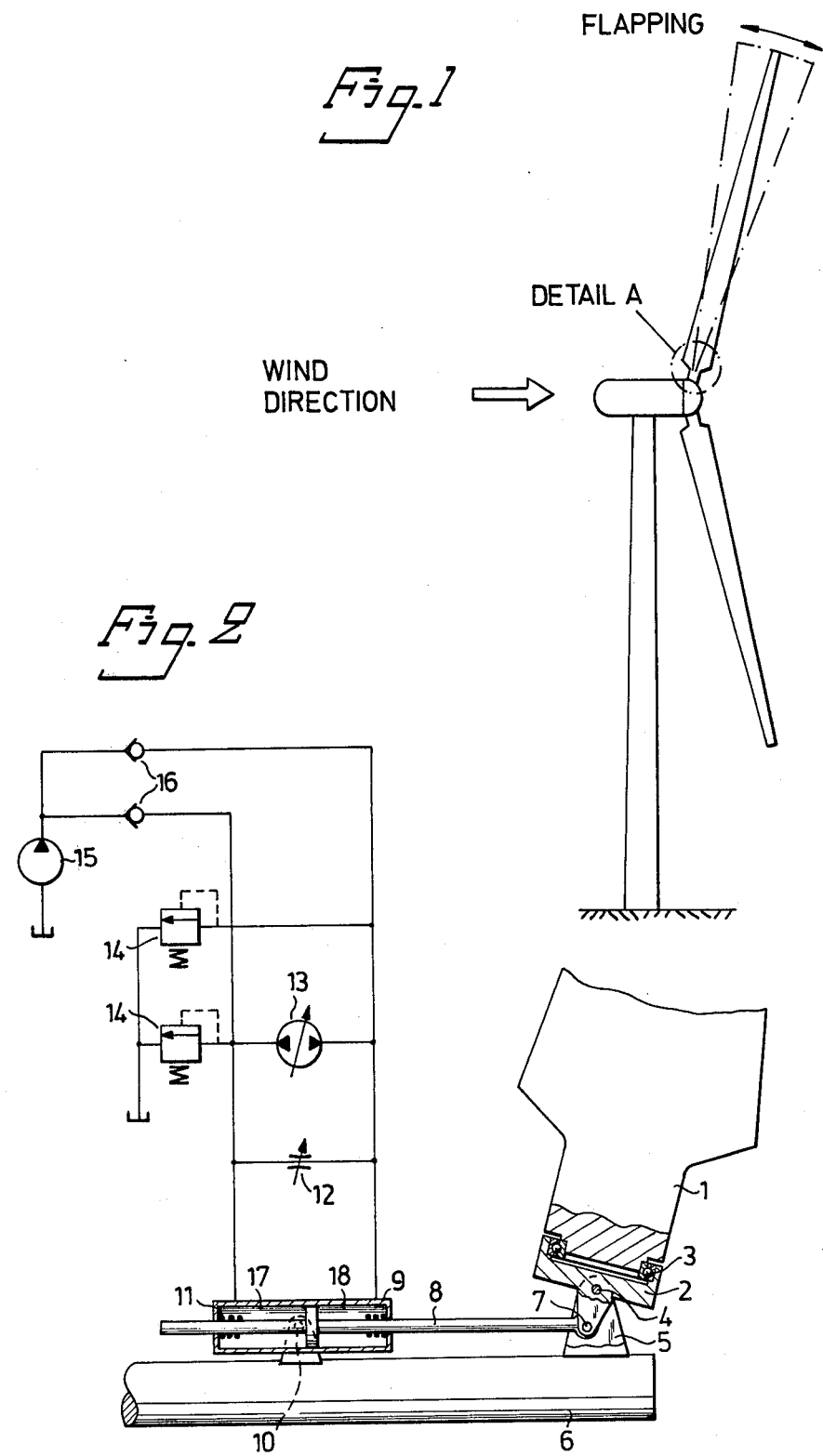

WINDMILL

The present invention relates to wind-turbines, and more particularly to wind-turbines having but few blades, mounted on a horizontal shaft. More specifically, the invention relates to means for regulating the position and rotation of the blades of such wind-turbines or windmills.

With respect to the degree of freedom of blade movement relative to the shaft, attachment of the blades to the shaft can be divided into four main groups, these being:

1. Rigid hub with fixed blades, in which the blades are mounted on the turbine shaft so as to be totally immovable relative to a vertical axis. This kind of attachment can only be used with "small" windmills, since it results in the occurrence of very large blade-forces which cannot be controlled.

2. Rigid hub with twistable blades, in which the blades are mounted on the turbine shaft in a manner which renders said blades resistant to torsional forces around said shaft and around an axis at right angles to the blades, but which enables the blades to twist about their own axes. Twisting of a blade about its own axis, sometimes known as feathering, enables the attitude of the blade to change in response to prevailing wind conditions, thereby enabling the blade to be held under a certain amount of control. Feathering can be controlled by the wind forces, a control system, or by a combination of the two.

3. Rocking hub with twistable blades (this method of attachment can only be applied with two-bladed windmills) in which the blades are connected together in a torsion-resistant manner to form a blade-pair which is mounted on the turbine shaft in a manner which renders said blade-pair resistant to torsion forces around the turbine shaft, but capable of rotating about an axis extending at right angles to said shaft and at right angles, or substantially at right angles to the bladepair. The blades are also coupled in a manner such that they can twist about their own axes, either individually or in concert. Rocking about the axis at right angles to, or substantially at right angles to the bladepair is normally a free movement, while feathering is controlled to varying degrees by the co-action of a control system, the wind-forces and rocking.

4. Flapping hub with twistable blades, each of which is attached to the turbine shaft in a manner to render said blade torsion-resistant around said shaft, but rotatable about an axis perpendicular to the turbine shaft and perpendicular or substantially perpendicular to the blade. The blades are either coupled so that they can be twisted together, or are individually twistable about their respective axes. Rotation of the blades about the axis extending at right angles to the turbine shaft—flapping —is generally free, while feathering is controlled to varying degrees through the co-action of a control system, windforces and flapping.

The four main methods of attachment afford in a rising numerical sequence reduction of forces and torque at the blade attachment point and the turbine shaft, since the wind-forces on the blade are balanced by inertia forces to a large extent. Problems of a structural nature increase, however, primarily due to increased requirements of damping and of restricting the limit positions of blade movement.

An object of the invention is to provide a wind-turbine of the aforedescribed kind in which all the advantages of a flapping hub from the power aspect are retained, while all the disadvantages associated with uncontrolled flapping movement are avoided.

Accordingly this invention consists in a wind-turbine or windmill having a substantially horizontal shaft and a flapping hub carrying the turbine blades, characterized in that the flap angle of the turbine blade is adjustable by means of the position of the piston of a double-acting piston-cylinder drive means, and in that the two chambers of the piston-cylinder drive means are connected to one another over a regulatable throttle valve. By means of the invention the flapping movement can be caused to act against a damping force having a varying degree of damping, so that freedom of blade movement can be varied continously between a state in which the blades can move completely freely and a state in which said blades are firmly held against movement. Damping can also be superimposed by a control pulse, so that rotation of the blades can be caused to take place about a desired centre position and locking take place in any desired position.

The invention will now be described in more detail with reference to the accompanying schematic drawings, in which FIG. 1 is a side view of a wind-turbine and illustrates the flapping movement.

FIG. 2 illustrates detail A shown in FIG. 1 in larger scale.

FIG. 2 also illustrates the principle structure and function of the invention.

A turbine blade 1 is rotatably mounted in a bearing housing 2. The bearing in the illustrated embodiment is a single-plane bearing 3, although said bearing can also be a two-plane bearing, depending upon the size of the turbine and upon considerations irrelevant to the invention.

The bearing housing 2 is journalled in a bracket structure 5 through a bearing 4, said bracket structure being fixedly connected to a turbine shaft 6. The axis of rotation of the bearing 4 is perpendicular or approximately perpendicular to blade 1 and turbine shaft 6.

The bearing housing 2 is pivotally connected by means of a pivot 7 to the piston rod 8 of a double-acting hydraulic piston-cylinder drive means 9, which in turn is pivotally connected to the turbine shaft 6 at a pivot 10, said pivot 7 being excentrically located relative to the bearing 4. The piston rod 8 extends through the hydraulic cylinder 9 in a manner such that the total volume of the chambers on both sides of the piston is constant. The cylinder can be provided with limit-position braking means and bottom-stroke damping means of hydraulic or mechanical construction, or of a combination thereof, illustrated symbolically in the figure by springs 11.

Extending from the two chambers 17 and 18 from the cylinder 9 are oil lines between which a regulatable throttle valve 12 and a regulatable pump 13 are coupled in parallel.

The system is also provided with pressure-limiting valves 14 for avoiding an overpressure in the system, and a low-pressure pump 15 which feeds the system over check valves 16, to avoid cavitation.

By co-regulating the throttle valve 12 and the pump 13, the blade 1 can be permitted to swing freely about the shaft 4 with the degree of damping afforded by a completely open valve, or can be damped so as to rotate about a desired centre position, or can be damped to an extent such that the blade is locked in a desired position. In this way any tendency to wide oscillations at revolutions lower than normal working revolutions, found with flapping hubs, are avoided, while at the same time the favourable properties of the flapping hub with respect to force-distribution are maintained.

The system, as a result of its properties, affords considerably improved conditions with respect to starting and stopping the windmill, and also enables production runs to be made at a wide variation of speed, which enables flapping hubs to be used without disadvantage, in systems having varying gearing between turbine and generator, and therewith a wide variation in turbine speed.

I claim:

1. In a wind-turbine having a substantially horizontal shaft carrying a plurality of turbine blades subjected to flap movement in use apparatus for damping the flap movement of each turbine blade to a selected degree, comprising a double acting piston-cylinder drive means, the piston rod of which being mechanically connected to said shaft and the cylinder of which having two chambers, a regulatable throttle valve, interconnecting each of the two chambers of said cylinder and a regulatable pump coupled to said two chambers in parallel with the throttle valve, said regulatable valve and pump coacting to cause said piston cylinder drive means to damp the oscillation of the blades to a desired degree to make said blades oscillate about a desired mean position or to lock the blades in a desired position.

* * * * *